United States Patent [15] 3,655,949
Rinn [45] Apr. 11, 1972

[54] DATA PROCESSING EQUIPMENT

[72] Inventor: Jurgen Rinn, Heuchelheim, Germany

[73] Assignee: Minox G.m.b.H., Ludwig Rinn Str., Giessen, Germany

[22] Filed: June 23, 1969

[21] Appl. No.: 835,458

[30] Foreign Application Priority Data

Sept. 13, 1968 Germany ......................P 17 74 818.4

[52] U.S. Cl. ......................235/61.11 E
[51] Int. Cl. ......................G06k 7/10
[58] Field of Search ..........235/61.11, 61.11 E; 250/219 D, 250/219 DC; 35/9, 48

[56] References Cited

UNITED STATES PATENTS

| | | | |
|---|---|---|---|
| 3,303,331 | 2/1967 | Biegel et al. | 235/61.11 |
| 3,476,917 | 11/1969 | Trebotich et al. | 235/61.7 |
| 3,500,047 | 3/1970 | Berry | 235/61.11 X |
| 2,429,730 | 10/1947 | Pitman | 235/61.11 C |
| 2,323,372 | 7/1943 | Bryce | 88/24 |

*Primary Examiner*—Daryl W. Cook
*Attorney*—Milton Robert Kestenbaum

[57] ABSTRACT

A feeding arrangement moves microfilm under an optical reading head. At the same time corresponding information in readable form is projected onto a predetermined position on a ground glass plate visible to an operator. Means are provided for initiating the reading process and to output it for further processing. An auxiliary keyboard adds other data to the output.

2 Claims, 1 Drawing Figure

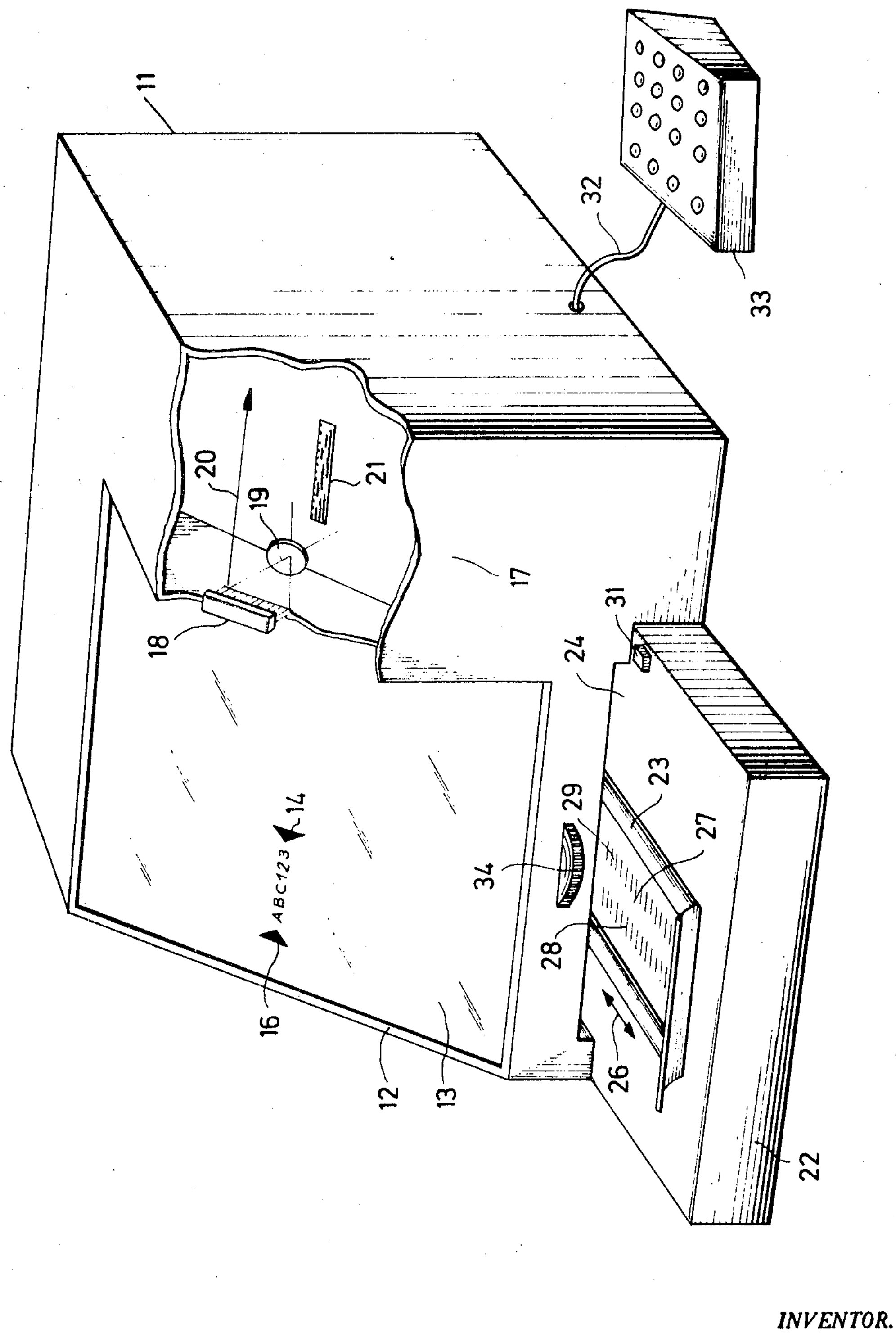
INVENTOR.
JURGEN RINN
BY M. R. Kistenian

DATA PROCESSING EQUIPMENT

This invention relates to a device for the preparation, processing and entering of data and more particularly to data processing equipment with a feeding arrangement for movable information carries, which carries information readable by human operators and corresponding information readable by the device, and with a readout station for the information.

In order to utilize data processing installations better, it is common practice to encode the data to be processed, usually entirely numerically, sometimes alpha-numerically, and rarely entirely alphabetically. Before the data can be put on input media such as, for instance, punched cards, perforated tape or magnetic tape, or be fed directly into the computer via a keyboard, it must be possible to ascertain their code designations. In some cases it may already be recorded on the original document, for instance if customers use order forms made available by the supplier, or for internal communications within a business unit. However, frequently the code designations must be looked up in an index if the operator does not remember them. The code designations are then entered in the document. Then they are read in the course of data processing and transferred to the data carrier or fed into computer directly via a keyboard. The repeated reading of the code designation, the intermediate storage in the human brain and the subsequent forwarding to the computer is expensive and highly unfavorable with regard to transmission errors.

For purposes of data processing, perforating and punching devices for punched cards and perforated tape and equipment for recording on magnetic tape, foil or disks are known. It is common to all these equipments that the data input takes place via a manually operated keyboard.

Also known are document reading machines which read markings or alphabetical and numerical symbols in certain fonts, convert them into corresponding electrical signals and transmit them to the data carriers or feed them directly to the computer. The use of such equipment for the purpose described above presupposes that uniform documents and one or only a few machine-readable fonts are used for a given application. Because of these two requirements, especially that of uniform documentation, and because of the high cost of such document-reading reading machines, their use is still very limited.

Perforators, punching devices and magnetic recorder machines are admittedly not tied to the requirement for a document-reading machine and are also considerably less expensive. However, they have the drawback that the data to be processed must be taken from an original document, partially encoded and then put into the machine manually via a keyboard. Expecially where data is to be encoded, such as by looking up the code for some unit, (for instance, for the code number of an article and for further specific data pertaining to an article) writing down the code, reading and typing, the expenditure in time and the probability of error are very high due to the purely manual sequence of operations.

Accordingly, the object of this invention is to provide a device with which it is possible even for a little-skilled person to generate data pertaining to a man-readable concept in the corresponding code without error, wherein, in spite of these advantages, the device is to work even more cheaply and faster, than perforators, punches, magnetic recorders, etc.

According to the invention, this object is solved by having both kinds of information recorded on an information carrier in the form of lists in such a manner that the information readable by the device is located under the read station when the information readable by and visible to the human operator coincides with a visual marking at a predetermined position. A mechanism is provided to initiate the reading process and the output of the read station is connected with a unit for further processing.

It is advantageous if in parallel to the output of the read station, a keyboard is provided for outputting additional data which are not contained on the information carrier. Thereby, variable data, for instance, the quantity ordered in the case of articles, can be entered at the same time, if they are not coded on the information carrier.

Further advantages and features of the invention will be seen from the following description of a preferred example of execution.

The single FIGURE shows an isometric view of a device according to the invention, partially cut away.

An approximately cube-shaped housing 11 is slanted in the region 12 which carries a ground glass plate 13 on which two marking arrows 14 and 16 are provided in fixed relation. On the extension 17 of the housing 11 an optical read head 18 is provided which, together with a condenser lens 19, is movable from left to right on a carriage, not shown, as per arrow 20, during the reading process of the information which appears in a window 21.

Built onto the housing 11 is a tray 22 which carries a frame 23 which can be pushed into the housing 11 through a slot 24 in the direction of the dual arrows 26, or can be removed again from the housing. A microfilm 27 can be inserted into the frame 23. In one region 28, the microfilm 27 carries information that can be read by a human operator, while next to this region 28 is a second region 29 in which machine-readable information is listed corresponding to the operator-readable information.

In the housing 11 an optical system is located which projects one item of information of the region 28 between the marking arrows 14 and 16, depending on the position of the frame 23 together with the microfilm 27. The information projected in this case is ABC 123. At the same time, the code recorded next to it in this case 29, as can be seen in the window 21, is projected in said window.

If the desired information, ABC 123, is correctly located between marking arrows 14 and 16, a button 31 can be pressed which initiates the reading process of the read head 18. For the sake of faster and better adjustment, only the information ABC 123 needs to be projected on the ground glass 13. However, information recorded above and below may also be projected in order to facilitate its looking up.

A keyboard 33 is connected to parallel to the output of the read head 18 via a cable 32. After, or prior to, the read operation of the read head 18, further information can be outputted via this keyboard 33. The keyboard 33 transmits, of course, pulses in the same code transmitted by the read head 18.

So that the information projected on the ground glass 13 can be sharply focussed, a knurled wheel 34 is provided by means of which a lens can be moved.

It is not necessary for the information carrier to be in the form of a single information carrier; a film roll and a perforated tape running parallel to it can, for instance, also be used.

What is claimed is:

1. A device for looking up selected information from tables of information and outputting said information from the tables and out of the device for further processing without interim human storage comprising means having a predetermined position for selectively viewing alpha numeric, man readable information in viewable list form on a carrier by an operator, a read station adapted to read corresponding information in machine readable form arranged on said carrier in constant geometric relation to said selectively viewed information for converting said selected information into corresponding electrical signals, carrier feeding means for randomly shifting viewable information on said carrier to said predetermined viewing position and corresponding machine readable information on said carrier to said read station, means for initiating the read process, and output means connected to said read station to output said corresponding electrical signals out of the device for further processing without interim human storage.

2. A data processing device according to claim 1, in which a keyboard is provided parallel to the read station for outputting additional data not contained on the information carrier.

* * * * *